United States Patent
Minnick et al.

(10) Patent No.: US 8,856,416 B2
(45) Date of Patent: Oct. 7, 2014

(54) METHOD AND APPARATUS FOR PROCESSING LATENCY SENSITIVE ELECTRONIC DATA WITH INTERRUPT MODERATION

(75) Inventors: Linden Minnick, Hillsboro, OR (US); Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1097 days.

(21) Appl. No.: 10/007,082

(22) Filed: Dec. 6, 2001

(65) Prior Publication Data
US 2003/0110281 A1 Jun. 12, 2003

(51) Int. Cl.
*G06F 13/24* (2006.01)
*H04L 12/861* (2013.01)
*H04L 29/06* (2006.01)

(52) U.S. Cl.
CPC ............ *H04L 69/16* (2013.01); *H04L 49/9063* (2013.01); *H04L 49/90* (2013.01); *H04L 69/12* (2013.01); *H04L 69/163* (2013.01); *H04L 69/161* (2013.01)
USPC ........... 710/266; 709/250; 710/260; 710/264; 370/230

(58) Field of Classification Search
CPC ....................................................... G06F 13/24
USPC .......................... 709/250; 710/260; 370/230
See application file for complete search history.

(56) References Cited

U.S. PATENT DOCUMENTS

| | | | | |
|---|---|---|---|---|
| 5,659,758 | A * | 8/1997 | Gentry et al. | 710/260 |
| 5,905,874 | A * | 5/1999 | Johnson | 709/250 |
| 5,926,457 | A * | 7/1999 | Feng | 370/230 |
| 5,943,479 | A * | 8/1999 | Klein et al. | 709/212 |
| 6,115,775 | A * | 9/2000 | Ross et al. | 710/260 |
| 6,115,776 | A * | 9/2000 | Reid et al. | 710/260 |
| 6,333,929 | B1 * | 12/2001 | Drottar et al. | 370/362 |
| 6,338,111 | B1 * | 1/2002 | Stevens | 710/260 |
| 6,345,301 | B1 * | 2/2002 | Burns et al. | 709/230 |
| 6,434,651 | B1 * | 8/2002 | Gentry, Jr. | 710/260 |
| 6,631,132 | B1 * | 10/2003 | Sourani | 370/389 |
| 6,999,995 | B2 * | 2/2006 | Khanna et al. | 709/208 |
| 7,065,762 | B1 * | 6/2006 | Duda et al. | 718/102 |

* cited by examiner

*Primary Examiner* — Glenford Madamba
(74) *Attorney, Agent, or Firm* — Christopher K. Gagne

(57) ABSTRACT

Numerous embodiments of a method and apparatus for processing latency sensitive electronic data with interrupt moderation are disclosed.

9 Claims, 3 Drawing Sheets

METHOD AND APPARATUS FOR PROCESSING LATENCY SENSITIVE ELECTRONIC DATA WITH INTERRUPT MODERATION

BACKGROUND

1. Field

This disclosure relates generally to computer input/output (I/O) devices and interrupt moderation.

2. Background Information

A computing platform or device is any hardware and/or software based system that includes the capability to perform logic and/or arithmetic operations, and may include the capability to transmit and receive data between itself and one or more additional computing platforms coupled via a transmission media. Computing platforms may include, without limitation, personal computers, laptop computers, servers, set-top boxes, hand-held devices, and numerous other types of systems. A computing platform may include code in the form of instructions, including but not limited to one or more device drivers or operating systems. Computing platforms coupled to a transmission medium may include, for example, servers, personal computers, routers, switches, or hubs. Additionally, there are several different types of networks, including Wide Area Networks (WAN) and Local Area Networks (LAN) to cite two possible examples.

Computer networks are typically constructed by coupling two or more computing platforms to a data transmission medium, such as, for example, fiber optic cable, category 5 (CAT-5) network cabling, or wireless media, such as a wireless local area network (WLAN). These computing platforms typically access the transmission medium through an input/output (I/O) device, such as a network interface card (NIC) or local area network (LAN) on motherboard (LOM), for example. I/O devices may comprise any device capable of routing, switching, repeating, receiving or passing data between one or more computing platforms or devices. An I/O device may include a network transmitter and/or receiver, and an I/O controller, for example. Electronic data is typically exchanged by using one or more types of data protocols, such as, for example, the transmission control protocol (TCP), which, as is well known, is a protocol that operates within a multi-layered packet-based protocol, such as the Ethernet protocol. Details regarding TCP/IP may be obtained by referencing Request For Comments (RFC) 1180, January 1991. RFC 1180 may be obtained from the World Wide Web at the following URL: www.freesoft.org. The Ethernet protocol is defined in the Institute for Electrical and Electronics Engineers standard 802.3, 2000 edition, available from IEEE standards, 445 Hoes Lane, P.O. Box 1331, Piscataway, N.J., 08855-1331. Additional information may be found on the World Wide Web at the following URL: http://www.ieee.org.

Recent developments in networking technology have resulted in increases in potential data transfer rates of electronic data across networks. In this context, electronic data refers to one or more bits of digital data. These advances may result in network data transfer rates that exceed the data processing rates of computing platforms, which may ultimately result in a decrease in overall data transfer efficiency. A need exists for a method of increasing the data processing rate of computing platforms.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, and components have not been described in detail so as not to obscure the claimed subject matter.

Typically, although the claimed subject matter is not limited in this respect, computing platforms coupled to a transmission medium are coupled through an input/output (I/O) device, such as a network interface card (NIC), which may alternatively be referred to as a server adapter, network adapter, or media access card, but the claimed subject matter is not limited in this respect. There are many types and categories of NICs, and the claimed subject matter is not limited to any particular type of NIC or I/O device, and may include external NICs, onboard NICs, or peripheral NICs, without limitation. One such NIC may comprise an Ethernet Media Access Controller (MAC), such as an Intel® 82543 GC Gigabit Controller, available from Intel Corporation, Santa Clara, Calif. Such NICs typically manage data transfer between a computer and a network, and typically operate using a particular type of protocol. There are many versions of protocols that may be used to practice the claimed subject matter, including Ethernet and Gigabit Ethernet, which, as is well known, relate to a 10 and 1000 Megabits per second (Mb/s) rate of electronic data transfer, respectively, although it will be understood that there are many other types of media access control protocols that may be used in accordance with the claimed subject matter. The Gigabit Ethernet protocol is defined for data transfer over fiber optic cable in the Institute of Electrical and Electronics Engineers (IEEE) standard 802.3z-1998, and for data transfer over CAT-5 cable in IEEE standard 802.3ab-1999. Details regarding this protocol can be obtained from IEEE Standards, 445 Hoes Lane, P.O. Box 1331, Piscataway, N.J. 08855-1331. Additional information can be found on the World Wide Web at the following URL: http://www.gigabit-ethernet.org. NICs such as the type previously described typically operate by utilizing at least one device driver. In one embodiment, a device driver comprises a software program that may reside on a computing platform, for example, and at least partially provides commands to the NIC and manages the operation of the NIC and how the NIC interacts with other components or systems coupled to a network.

Figure 1:
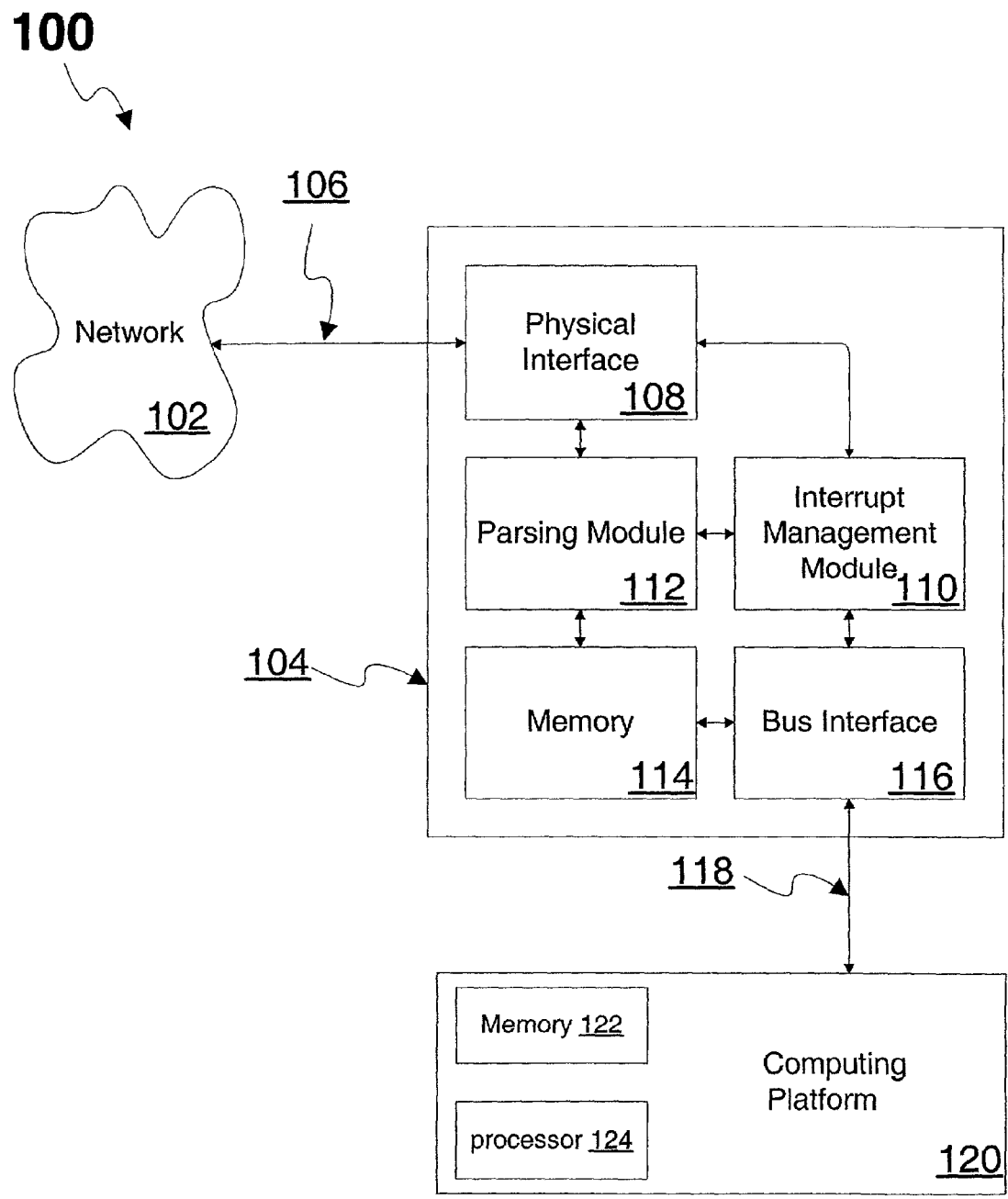
FIG. 1 is a schematic diagram of an I/O device and computing platform in accordance with one embodiment of the claimed subject matter.

FIG. 1 illustrates one embodiment of an I/O device coupled to a computing platform, although the claimed subject matter is not limited in this respect. 100 is an example of a system comprising an I/O device 104, coupled to a network 102. I/O device 104 may, in one embodiment, be coupled to a network 102 by or through transmission media 106. As stated previously, transmission media may include, for example, fiber optic cable, category 5 (CAT-5) network cabling, or wireless media, such as a wireless local area network (WLAN). Transmission media 106 may, in one embodiment, be coupled to I/O device 104 through a physical interface 108. In one embodiment, I/O device 104 is coupled to a computing platform 120. I/O device 104 may, in one embodiment, be coupled to computing platform 120 by a platform bus 118. There are many different types of platform buses that may be used in accordance with the claimed subject matter. One such platform bus comprises a bus that complies with a peripheral component interconnect (PCI) version 2.2 specification or a PCI-X version 1.0a specification compliant bus. Information regarding the PCI version 2.2 specification and/or PCI-X version 1.0a specification may be obtained from the PCI special interest group (PCI-SIG), 5440 SW Westgate Dr., 217, Portland, Oreg. 97221. Additional information may be obtained at the PCI-SIG website on the World Wide Web at the following URL: www.pcisig.com. Platform bus 118 may, in one embodiment, be coupled to I/O device 104 through a bus interface 116. It will, of course be understood that this is just one embodiment, and I/O device 104 may be coupled to computing platform 120 via a transmission medium other than a platform bus and still be within the scope of the claimed subject matter.

As is well-known, network architectures are typically designed by partitioning complex tasks into one or more subtasks, also known as layers. A layer typically communicates with one or more peer layers in a format referred to as a protocol. In this context, a set of related protocols may be referred to as a protocol stack. A protocol, in this context, comprises a set of rules and conventions that may be employed by one layer to communicate with another layer in an associated network. An example of a protocol having layers may include the transmission control protocol (TCP). TCP operates, at least in part, to send and/or receive fragments of electronic data across a network. A fragment of electronic data, in this context, comprises a temporally contiguous sequence of digital data pulses. A packet, in this context, comprises one or more fragments of electronic data. In the process of sending and/or receiving data packets, TCP will typically utilize an acknowledgement, or ACK, to confirm that a particular fragment or packet of electronic data was successfully delivered to a particular node on an associated network. As is well-known, once an I/O device operating within a TCP environment transmits a data packet, typically the I/O device that receives the packet will send an ACK to confirm delivery. If an ACK is not received by the sending I/O device within a particular period of time, also referred to as a timeout, the sending I/O device will typically re-send at least a portion of the electronic data. The elapsed time between a packet being transmitted by an I/O device and an ACK being received by the sending I/O device is commonly referred to as round trip time (RTT). Typically, in a TCP environment, electronic data transmission rates are affected by the RTT. As RTT increases, throughput or the electronic data transfer rate typically decreases. Electronic data transmission rates in a TCP environment are also typically affected by the TCP window size. Window size, as is well known, is the amount of data that may typically be sent by an I/O device before it waits to receive an ACK, and may affect data flow or data congestion across a network. Typically, if an ACK has not been received by a transmitting I/O device subsequent to the window size being met, the transmitting I/O device will not send additional data. ACK packets are one type of latency sensitive packets or data fragments, meaning, in this context, that these packets have the capability to affect the data transfer rate in the manner described previously, if not processed in an efficient or timely manner, although the claimed subject matter is not limited to just ACK packets. Again, this is just one type of latency sensitive packets or data fragments.

Latency sensitive fragments of electronic data, in this context, comprise one or more fragments of electronic data that may be more time sensitive than typical fragments of electronic data. This may include, for example, ACK packets, as stated previously. This may additionally include fragments of electronic data designated for streaming media applications, or may include one or more data packets that have a priority designation. In this context, time sensitive refers to a fragment of electronic data that may have an affect on the performance of a computing platform or software application if not received and processed within a particular period of time, or within a timely fashion, although the claimed subject matter is not limited in this respect. Examples of a designation of priority in a packet may include, for example, a designation in the priority field, or the precedence or type of service (ToS) fields in a packet that complies with the Ethernet protocol. Priority status may not be designated in a particular field, but the type of packet may be detected and identified as high priority by the receiving device based, at least in part, on the packet type. Priority designations are well known in the art, and the claimed subject matter is not limited to just these examples of priority designations or time sensitive fragments of electronic data.

As is well known, computing platforms typically utilize interrupts to shift control or partially shift control of a processor, and may shift which task is being processed by a processor, or alter the particular manner in which a task is processed. For example, an interrupt may be asserted in order to stop or slow down the processing of a particular task, and allow it to at least partially process another task, such as, for example, processing data that has been received by an I/O device. As stated previously, when an interrupt is asserted, the task being processed by the processor prior to the interrupt will typically cease. Typically, data processing rates may be affected by the number and frequency of interrupts used on a processor, as typically, asserting interrupts will stop the processing of certain functions, and start the processing of other functions. Computing platforms may have one or more interrupt schemes. An interrupt scheme, in this context, refers to a method, plan or criteria for when and how to assert or allow the assertion of interrupts. Interrupt moderation, in this context, refers to the assertion or deferral of interrupts based at least in part on a particular interrupt scheme. For example, an interrupt scheme may be designed to assert or allow the assertion of one or more interrupts of a computing system processor if a particular device requests that data be processed, such as, for example, an I/O device requesting that a computing system processor process data that the I/O device has received. Alternatively, an interrupt scheme may be designed to allow a device to assert one or more interrupts after a certain number of similar requests have been received, after a passage of time, or any number of other factors, although the claimed subject matter is not limited in this respect. An interrupt scheme may be designed based on one or more factors that may include, for example, asserting one or more interrupts to improve processor usage, asserting one or more interrupts to process data received by an I/O device as quickly as practical, or to assert one or more interrupts based on importance of the time sensitivity of the data which is requested to be processed, although the claimed subject matter is not limited in this respect.

In one embodiment, the interrupt scheme of an associated computing platform may be designed to assert or allow the assertion of one or more interrupts based on the contents of a fragment of electronic data. In this embodiment, this may include the receipt of a fragment of electronic data that is latency sensitive, as stated previously. In one embodiment of the claimed subject matter, a method and/or apparatus for processing latency sensitive data by using interrupt moderation may comprise an I/O device as shown in FIG. 1. I/O device 104 may be comprised of several components, including but not limited to a physical interface 108, a bus interface 116, a parsing module 112, a memory 114, and an interrupt moderation management module 110. A physical interface, in this context, refers to an interface permitting a transmission media, such, as for example, fiber optic cable, to be coupled to the I/O device, and may also include the receiver of the electronic data within the I/O device. An interrupt management module, in this context, refers to a device or software capable of at least partially generating interrupts, and/or deferring interrupts, based at least in part on an interrupt scheme, which may itself be based on particular criteria such as packet type, for example, as explained in more detail later.

In operation, a fragment of electronic data may be received by I/O device 104, from a node on an associated network 102. As stated previously, this fragment of electronic data may be at least partially received at physical interface 108. The physical interface may, in this embodiment, pass at least a portion of the electronic data to the parsing module 112, although in alternative embodiments, the data fragment may be passed to other components of the I/O device such as, for example, memory 114. The parsing module, in this embodiment, performs functions, such as, substantially determining the characteristics of a fragment of electronic data, such as, for example, packet type, if the fragment of electronic data comprises a data packet. The parsing module may alternatively, or additionally, determine the size of the fragment, if, for example, the fragment of electronic data comprises an ACK, or if, for example, the fragment of electronic data has one or more priority designations or otherwise comprises a latency sensitive fragment. Parsing modules are well known in the art, and the claimed subject matter is not limited to any particular type of parsing module or to any device or software that utilizes one or more parsing functions as a separate module. Parsing module 112 may, in this embodiment, pass information about the characteristics of a fragment of electronic data to interrupt management module 110. Subsequently, the parsing module may, in this embodiment, pass at least a portion of the fragment of electronic data to memory 114. Interrupt management module 110 may, in this embodiment, moderate the interrupt scheme of the I/O device based at least in part on the characteristics of a fragment of electronic data. For example, if parsing module 112 determines that a fragment of electronic data comprises an ACK packet, the parsing module may pass this information to interrupt management module 110. Interrupt management module 110 may, in one embodiment, moderate an interrupt so that the I/O device may generate an interrupt of processor 124 of an associated computing platform 120 substantially immediately after receipt of the ACK, so computing platform 120 may then process at least a portion of the fragment of electronic data.

Figure 2:
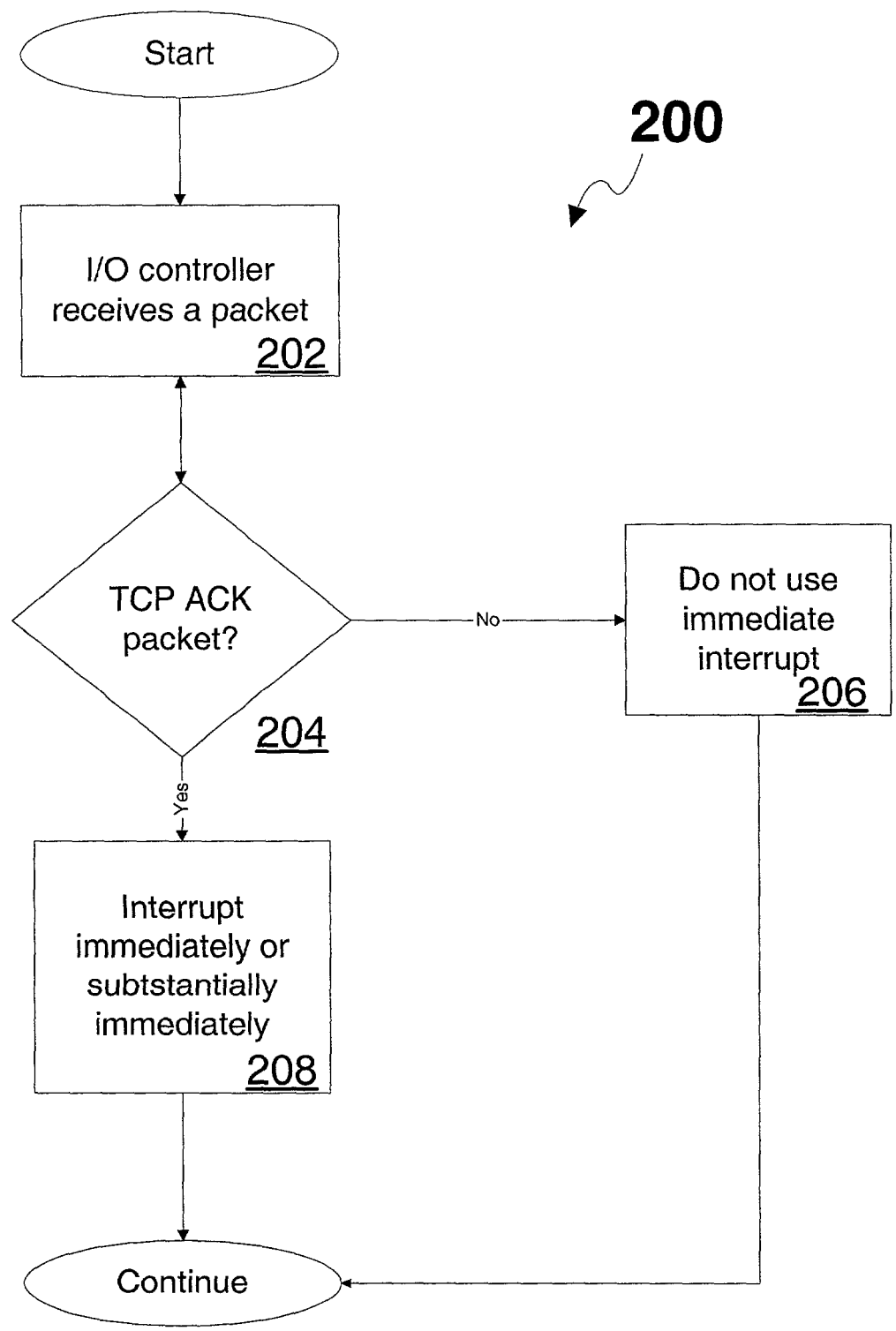
FIG. 2 is a flowchart illustrating one embodiment of the claimed subject matter.

FIG. 2 illustrates one embodiment of a method and/or apparatus for processing latency sensitive data by using interrupt moderation in accordance with the claimed subject matter. In this particular embodiment, 202 includes an I/O controller receiving a fragment of electronic data, which, in this embodiment, comprises a packet. 204 may be performed by a parsing module, in this embodiment, and the parsing module may inspect the packet to determine if it is an ACK packet. If the packet is not an ACK packet, 206 includes providing an instruction to the I/O device to moderate an interrupt by deferring an interrupt of an associated computing platform processor. If, however, the parsing module determines in 204 that the fragment of electronic data comprises an ACK packet, 208 includes providing an instruction to the I/O device to then assert an immediate or substantially immediate interrupt of an associated computing system processor, although, of course, the claimed subject matter is not limited in this respect. For example, if at 204 it is determined that the fragment of electronic data comprises an ACK packet, the I/O device may defer interrupting an associated computing system processor, or defer it for a particular period of time, or until more ACK packets are received. These are just a few examples of alternative embodiments. Additionally, as stated previously, the I/O device may base interrupt moderation on other criteria of fragments of electronic data, such as packet size, packet priority, number of packets received, or amount of data received over a particular period of time, but the claimed subject matter is not limited to these examples. Additionally, 208 may include an instruction to the I/O device to then assert an immediate or substantially immediate interrupt after the expiration of a particular period of time, but, again, the claimed subject matter is not limited in this respect.

It will, of course, be understood that this is just one embodiment of the claimed subject matter, and alternative methods of interrupt moderation may be implemented in accordance with the claimed subject matter. For example, in an alternative embodiment, I/O device 104 of FIG. 1 may receive a fragment of electronic data from an associated network 102. As stated previously, this fragment of electronic data may be at least partially received at the physical interface 108. The physical interface may, in this alternative embodiment, pass at least a portion of the electronic data to memory 114. Interrupt management module 110 may, in this embodiment, moderate the interrupt functions of the I/O device depending at least in part on the characteristics of a fragment of electronic data, such as the size. For example, if interrupt management module 110 determines that the fragment of electronic data is below a certain size, such as 80 bytes, for example, interrupt management module 110 may then moderate the interrupt and generate an interrupt of processor 124 of an associated computing platform 120 after one or more of these data fragments have been received. Additionally, the interrupt management module may generate an interrupt of processor 124 after a certain amount of memory module 114 has been utilized to store fragments of electronic data. For example, interrupt management module 110 may generate an interrupt of processor 124 after 10 Kilobytes of fragments of electronic data have been stored in memory module 114, although the claimed subject matter is not limited in this respect. In another alternative embodiment, the interrupt management module may moderate one or more interrupts based at least in part on characteristics of a fragment of electronic data, such as a priority designation that may be designated by at least a portion of the fragment of electronic data, as explained previously. For example, if a fragment of electronic data is designated as high priority, this information may be identified at least in part by parsing module 112, and this information may be passed at least partially to interrupt management module 110. Interrupt management module 110 may, in this alternative embodiment, generate an interrupt of processor 124 at a time subsequent to the receipt of the fragment of electronic data, and instruct the computing platform 120 to process at least a portion of the fragment of electronic data. Additionally, an interrupt management module may track the number of interrupts per unit of time that have been generated, and if a predetermined maximum number of interrupts per unit of time has been reached, an interrupt may be deferred for a particular period of time, even if a fragment of electronic data comprises a high priority packet.

Figure 3:
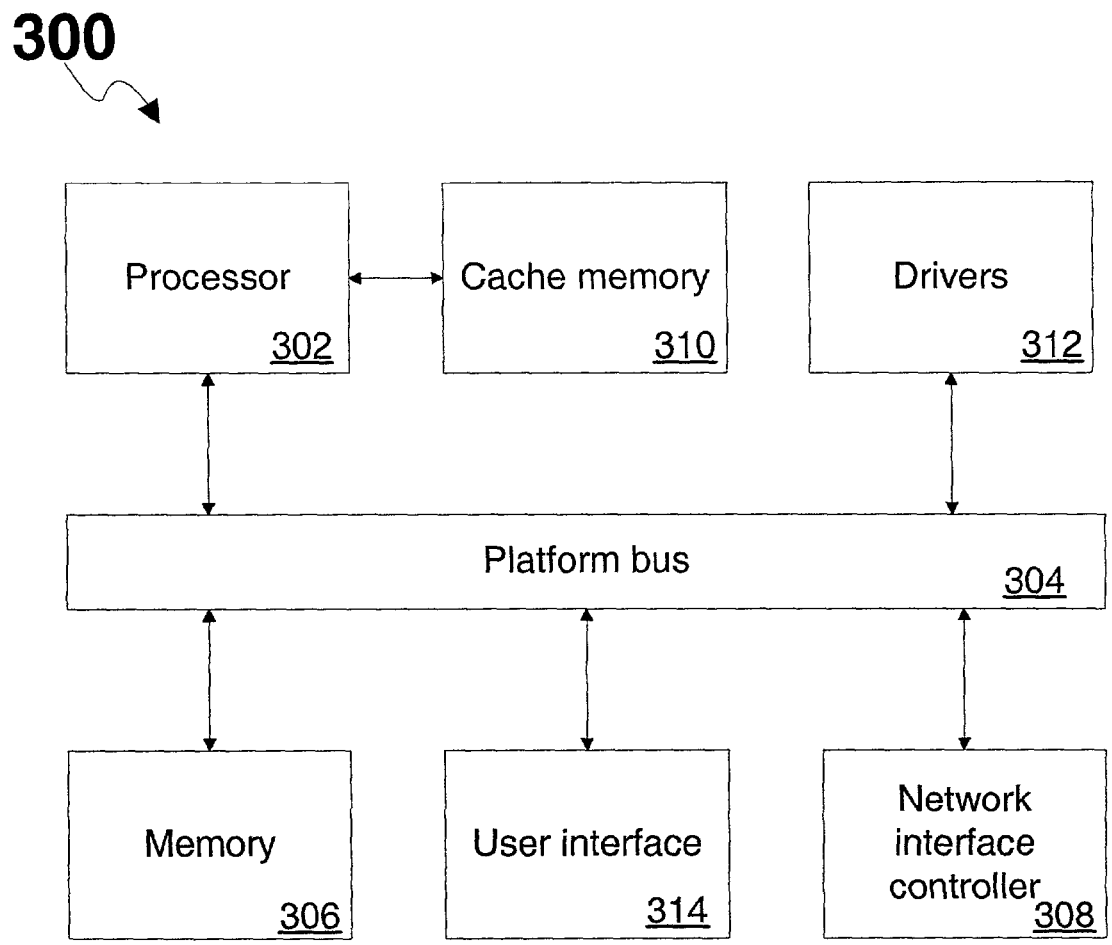
FIG. 3 is a diagram of a computing platform in accordance with one embodiment of the claimed subject matter.

In yet another alternative embodiment, interrupt moderation or an interrupt scheme may be controllable at least in part by a user. In this yet another alternative embodiment, a user may establish criteria for determining when to interrupt an associated computing platform processor 124 of FIG. 1 to process at least a portion of electronic data, such as, for example, elapsed time after receipt of a fragment of electronic data, particular characteristics of fragments of electronic data, or quantity of fragments of electronic data received, or any combination thereof, but the claimed subject matter is not limited to just these criteria. A user, in this alternative embodiment, may program the apparatus for processing latency sensitive electronic data by using interrupt moderation. This programming may take place through a user interface, for example. The interface, in one embodiment, may comprise a user interface or graphical user interface for an associated computing platform, as shown in FIG. 3. The user, in this alternative embodiment, may enter criteria, such as the criteria stated previously, and substantially program an associated I/O device 104 to interrupt an associated computing platform processor 124 based on one or more of the above-mentioned criteria. The user may, in this yet another alternative embodiment, program the I/O device 104 to moderate one or more interrupts of an associated computing platform processor 124 prior to the receipt of a fragment of electronic data, after the receipt of a fragment of electronic data, or any other time, but the claimed subject matter is not limited in this respect.

Embodiments of the claimed subject matter may be implemented in hardware, firmware or software, or any combination thereof. Embodiments of the claimed subject matter may be implemented as a computer program executing on a computing system, comprised of at least one processor, a data storage system, which includes volatile and non-volatile memory and/or storage elements, at least one input device, and at least one output device. FIG. 3 is a block diagram of a system 300 of one embodiment of the claimed subject matter. System 300 includes a processor 302 that processes data signals, and may comprise, for example, a PENTIUM® III or PENTIUM® 4 microprocessor available from Intel Corporation. Processor 302 may be coupled to a processor bus 304 that transmits data signals between processor 302 and other components in system 300. System 300 may include a memory 306. Memory 306 may store instructions and/or data represented by data signals that may be executed by processor 302. The instructions and/or data may comprise code for performing any and/or all of the techniques, for example. Memory 306 may also store additional software previously described and/or data in accordance with this embodiment, including device drivers for associated components. The software alternatively may be stored on a data storage device 312, such as, for example, a floppy disk drive, a read only memory (ROM), a CD-ROM device, a flash memory device, a digital versatile disk (DVD), or other storage device. A cache memory 310 may reside within processor 302 that stores data signals received from memory 306. A network controller 308 may be coupled to processor bus 304. A user interface 314 may be coupled to the processor bus 304, or execute on a component coupled to bus 304, and may typically allow a user to gain access to one or more components of system 300. For purposes of this application, a processing system embodying dynamic coalescing components includes any system that has a processor, such as, for example, a digital signal processor (DSP), a microcontroller, an application specific integrated circuit (ASIC), or a microprocessor.

While certain features of the claimed subject matter have been illustrated as described herein, many modifications, substitutions, changes, and equivalents will now occur to those skilled in the art. It is, therefore, to be understood that the appended claims are intended to cover all such embodiments and changes as fall within the true spirit of the claimed subject matter.

What is claimed is:

1. An apparatus comprising:
an input/output (I/O) device to determine whether to defer interrupting of a processor to process a received fragment of electronic data, based at least in part upon both a priority of the received fragment and a number of interrupts generated per unit of time, the device to determine whether to defer the interrupting such that if the priority of the received fragment is a relatively higher priority relative to a relatively lower priority and the number of interrupts generated per the unit of time exceeds a predetermined maximum number, the device is to determine that the interrupting for the received fragment of the relatively higher priority is to be deferred for a particular time period, even though the received fragment is of the relatively higher priority;
a graphical user interface to permit user entry of device programmable criteria, the device programmable criteria being to program the device to interrupt the processor based upon the criteria, the criteria comprising an elapsed time after receipt of the received fragment and quantity of received fragments of the electronic data;
wherein:
the device comprises memory to store fragments of the electronic data designated for a streaming media application;
the device is to defer the interrupting until after a certain amount of the memory has been utilized to store the fragments; and
the received fragment comprises a transmission control protocol (TCP) acknowledgement (ACK) packet.

2. The apparatus of claim 1, wherein:
the priority of the received fragment is designated by at least a portion of the received fragment; and
the device is to defer the interrupting until after more TCP ACK packets are received.

3. The apparatus of claim 1, wherein:
the device comprises:
a physical interface to receive, at least partially, the received fragment;
a parsing module to determine characteristics of the received fragment, the characteristics including the priority of the received fragment; and
an interrupt management module to determine whether to defer the interrupting, to track the number of interrupts generated per the unit of time, and to determine whether the number of interrupts generated per the unit of time exceeds the predetermined maximum number; and
the apparatus comprises a peripheral component interconnect transmission medium and the processor, the medium to permit signals to be propagated between the processor and the device, the processor including a cache memory.

4. A method comprising:
determining by an input/output (I/O) device whether to defer interrupting of a processor to process a received fragment of electronic data, the determining being based at least in part upon both a priority of the received fragment and a number of interrupts generated per unit of time, the determining being made such that if the priority of the received fragment is a relatively higher priority relative to a relatively lower priority and the number of interrupts generated per the unit of time exceeds a predetermined maximum number, the interrupting for the received fragment of the relatively higher priority is to be deferred for a particular time period, even though the received fragment is of the relatively higher priority;

permitting user entry, via a graphical user interface, of device programmable criteria, the device programmable criteria being to program the device to interrupt the processor based upon the criteria, the criteria comprising an elapsed time after receipt of the received fragment and quantity of received fragments of the electronic data;

wherein:
the device comprises memory to store fragments of the electronic data designated for a streaming media application; and the device is to defer the interrupting until after a certain amount of the memory has been utilized to store the fragments; and the received fragment comprises a transmission control protocol (TCP) acknowledgement (ACK) packet.

5. The method of claim 4, wherein:
the priority of the received fragment is designated by at least a portion of the received fragment; and
the device is to defer the interrupting until after more TCP ACK packets are received.

6. The method of claim 4, wherein:
the device comprises:
a physical interface to receive, at least partially, the received fragment;
a parsing module to determine characteristics of the received fragment, the characteristics including the priority of the received fragment; and
an interrupt management module to determine whether to defer the interrupting, to track the number of interrupts generated per the unit of time, and to determine whether the number of interrupts generated per the unit of time exceeds the predetermined maximum number; and
a peripheral component interconnect transmission medium permits signals to be propagated between the processor and the device, the processor including a cache memory.

7. Non-transitory storage medium storing at least one of instructions and data that when executed by a machine results in operations comprising:
determining by an input/output (I/O) device whether to defer interrupting of a processor to process a received fragment of electronic data, the determining being based at least in part upon both a priority of the received fragment and a number of interrupts generated per unit of time, the determining being made such that if the priority of the received fragment is a relatively higher priority relative to a relatively lower priority and the number of interrupts generated per the unit of time exceeds a predetermined maximum number, the interrupting for the received fragment of the relatively higher priority is to be deferred for a particular time period, even though the received fragment is of the relatively higher priority;

permitting user entry, via a graphical user interface, of device programmable criteria, the device programmable criteria being to program the device to interrupt the processor based upon the criteria, the criteria comprising an elapsed time after receipt of the received fragment and quantity of received fragments of the electronic data;

wherein:
the device comprises memory to store fragments of the electronic data designated for a streaming media application;

the device is to defer the interrupting until after a certain amount of the memory has been utilized to store the fragments; and the received fragment comprises a transmission control protocol (TCP) acknowledgement (ACK) packet.

8. The storage medium of claim 7, wherein:
the priority of the received fragment is designated by at least a portion of the received fragment; and
the device is to defer the interrupting until after more TCP ACK packets are received.

9. The storage medium of claim 7, wherein:
the device comprises:
a physical interface to receive, at least partially, the received fragment;
a parsing module to determine characteristics of the received fragment, the characteristics including the priority of the received fragment; and
an interrupt management module to determine whether to defer the interrupting, to track the number of interrupts generated per the unit of time, and to determine whether the number of interrupts generated per the unit of time exceeds the predetermined maximum number; and
a peripheral component interconnect transmission medium is to permit signals to be propagated between the processor and the device, the processor including a cache memory.

* * * * *

UNITED STATES PATENT AND TRADEMARK OFFICE
CERTIFICATE OF CORRECTION

| | | |
|---|---|---|
| PATENT NO. | : 8,856,416 B2 | Page 1 of 1 |
| APPLICATION NO. | : 10/007082 | |
| DATED | : October 7, 2014 | |
| INVENTOR(S) | : Linden Minnick et al. | |

It is certified that error appears in the above-identified patent and that said Letters Patent is hereby corrected as shown below:

In The Claims

In column 8, line 26, In Claim 1, delete "interupt" and insert -- interrupt --, therefor.

Signed and Sealed this
Tenth Day of February, 2015

Michelle K. Lee
*Deputy Director of the United States Patent and Trademark Office*